United States Patent
Sadler et al.

(10) Patent No.: US 7,789,307 B2
(45) Date of Patent: Sep. 7, 2010

(54) IDENTIFIER FOR MEMORY TAGS

(75) Inventors: Martin Sadler, Bristol (GB); James Thomas Edward McDonnell, Bristol (GB); Robert Francis Squibbs, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 880 days.

(21) Appl. No.: 11/361,985

(22) Filed: Feb. 27, 2006

(65) Prior Publication Data

US 2006/0208089 A1    Sep. 21, 2006

(30) Foreign Application Priority Data

Feb. 25, 2005  (GB) ................... 0503843.5

(51) Int. Cl.
    *G06K 7/00* (2006.01)
(52) U.S. Cl. ..................... 235/435; 235/494
(58) Field of Classification Search ............. 235/435, 235/492, 462.09, 494
    See application file for complete search history.

(56) References Cited

U.S. PATENT DOCUMENTS

| | | | |
|---|---|---|---|
| 6,109,526 A * | 8/2000 | Ohanian et al. | 235/462.45 |
| 6,830,181 B1 | 12/2004 | Bennett | |
| 7,055,750 B2 * | 6/2006 | Carrender | 235/472.01 |
| 7,114,655 B2 * | 10/2006 | Chapman et al. | 235/462.01 |
| 7,190,257 B2 * | 3/2007 | Maltseff et al. | 340/10.51 |
| 7,364,074 B2 * | 4/2008 | He et al. | 235/385 |
| 7,380,714 B2 * | 6/2008 | Jusas et al. | 235/451 |
| 7,549,591 B2 * | 6/2009 | Lubow | 235/491 |
| 2003/0075608 A1 * | 4/2003 | Atherton | 235/492 |
| 2003/0111542 A1 | 6/2003 | Look | |
| 2004/0044956 A1 * | 3/2004 | Huang | 715/511 |
| 2004/0189459 A1 | 9/2004 | Sills et al. | |

FOREIGN PATENT DOCUMENTS

| | | |
|---|---|---|
| GB | 2304077 | 3/1997 |
| JP | 2000-90228 | 3/2000 |
| WO | WO 00/48115 | 8/2000 |

* cited by examiner

*Primary Examiner*—Ahshik Kim

(57) ABSTRACT

A memory tag has a memory. Associated with the memory tag there is a readable structure. The readable structure can be read to generate an identifier. However, the readable structure cannot be provided so as to encode a predetermined identifier.

20 Claims, 7 Drawing Sheets

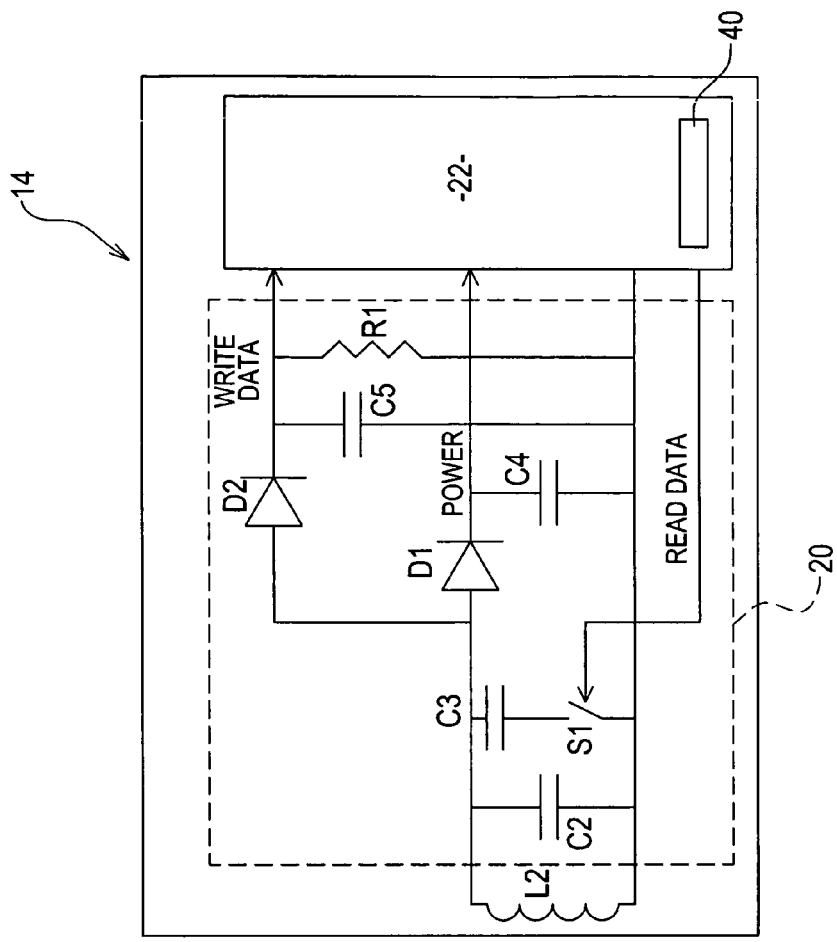
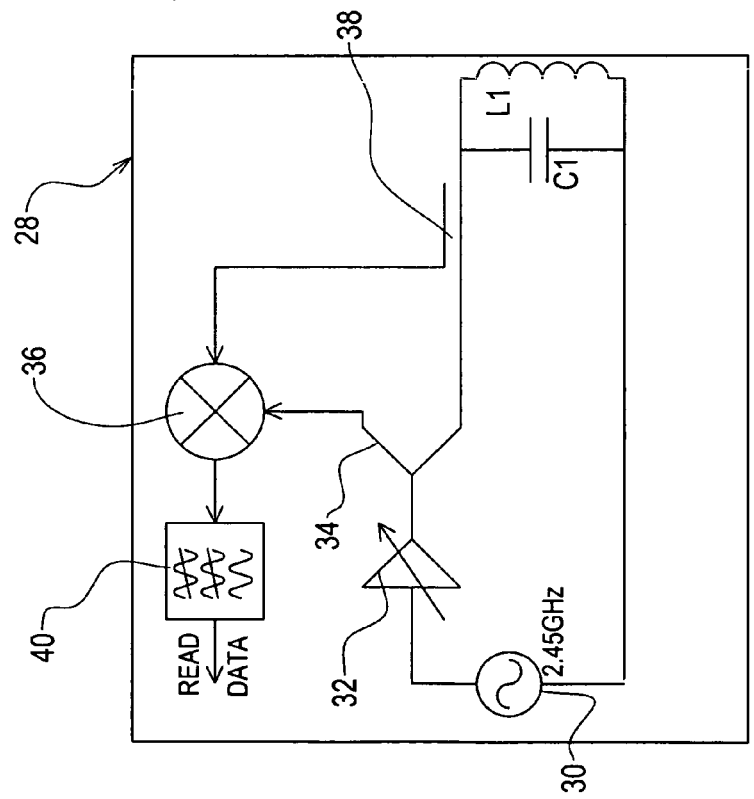
FIG. 3

IDENTIFIER FOR MEMORY TAGS

This application claims priority from Great Britain patent application GB 0503843.5, filed on Feb. 25, 2005, the entire contents of which is incorporated herein by reference.

FIELD OF THE INVENTION

This invention relates to a memory tag, a document comprising a substrate and a memory tag, and a method of providing a memory tag where the memory tag is provided with an identifier and a readable structure associated with the memory tag.

BACKGROUND OF THE INVENTION

Transponders in the form of Radio Frequency Identification (RFID) tags are well known in the prior art. RFID tags come in many forms but all comprise an integrated circuit on which in use data can be stored and a coil which enables it to be interrogated by a reader which also powers it by means of an inductive (wireless) link. One use to which such RFID tags can be put is the annotation of items, such as documents, with data matching to one addition to those printed on the document. For example, in our earlier GB-A-2395592, the provision of a plurality of a relatively small memory tag having a memory from which data can be read and to which data can be written on a printed document, where the memory tags can be accessed for an appropriate read/write device.

It is known to provide RFID tags with a unique identifier; in the case of the Hitachi mu-chip, the unique identifier is all the data that is held within the memory. However, where it is possible to write data to the memory of a transponder, then there is a possibility that a unique identifier stored in the memory could be amended or tampered with, even where some form of write-protection is provided. It can be envisaged that this may be undesirable in some applications, such as in legal or financial documents, where it may be necessary to verify the authenticity of the information in the document and/or stored on the transponder.

SUMMARY OF THE INVENTION

According to one aspect of the invention, we provide a memory tag having a memory, there being a readable structure associated with the memory tag, the readable structure being readable to generate an identifier but wherein the readable structure cannot be provided to encode a predetermined identifier.

BRIEF DESCRIPTION OF THE DRAWINGS

Embodiments of the invention will now be described by way of example only with reference to the accompanying drawings in which:

FIG. 3 illustrates the circuitry of the memory tag of FIG. 2 and of a read/write device for wireless communication with the memory tag according to an embodiment of the invention;

DETAILED DESCRIPTION OF THE PREFERRED EMBODIMENTS

Figure 1:
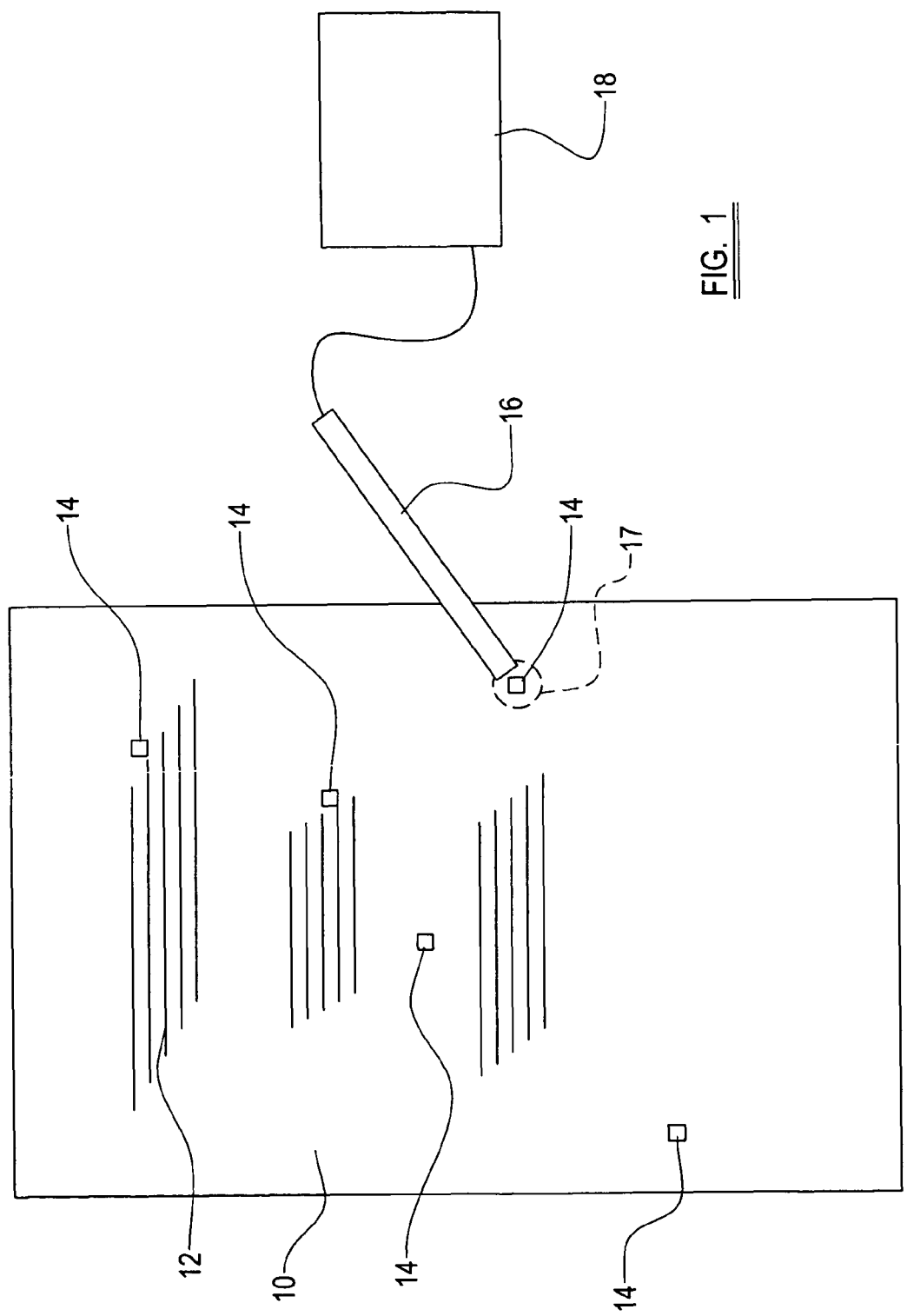
FIG. 1 illustrates a document provided with memory tags according to an embodiment of the invention.

FIG. 1 shows a document, in this case having a substrate comprising a sheet of paper 10, bearing printing 12, which has provided a plurality of memory tags 14. The memory tags 14 have been secured to the sheet of paper 10 at various locations over its surface, although they may alternatively be embedded in the paper sheet 10, preferably in locations identified by the printing 12, in order to assist in locating them for the purposes of reading data from or writing data to the memory tags 14.

In this description, 'memory tag' refers to a memory device without an integral power source capable of holding significant data. In a preferred arrangement, such a memory tag is a transponder device having a memory in which data is stored and where the transponder device is readable via and powered by a radio frequency wireless communication link, in the present example through inductive coupling. The term 'memory tag' may thus include, but is not limited to, read only RFID tags of known type and transponder devices with a memory which may be read from and written to. However, memory tags of particular interest in the present case have capability for storage of significant digital content, unlike a conventional RFID tag. A preferred form of memory tag will be described in more detail below.

A hand held read/write device 16 is used to communicate with the memory tags 14 in wireless manner, as will be discussed further below. The read/write device 16 is also connected to a host computer, display, data rendering device or other apparatus 18 from which the data for writing to the memory tags 14 is received, and/or the data read from the memory tags 14 is passed.

Figure 2:
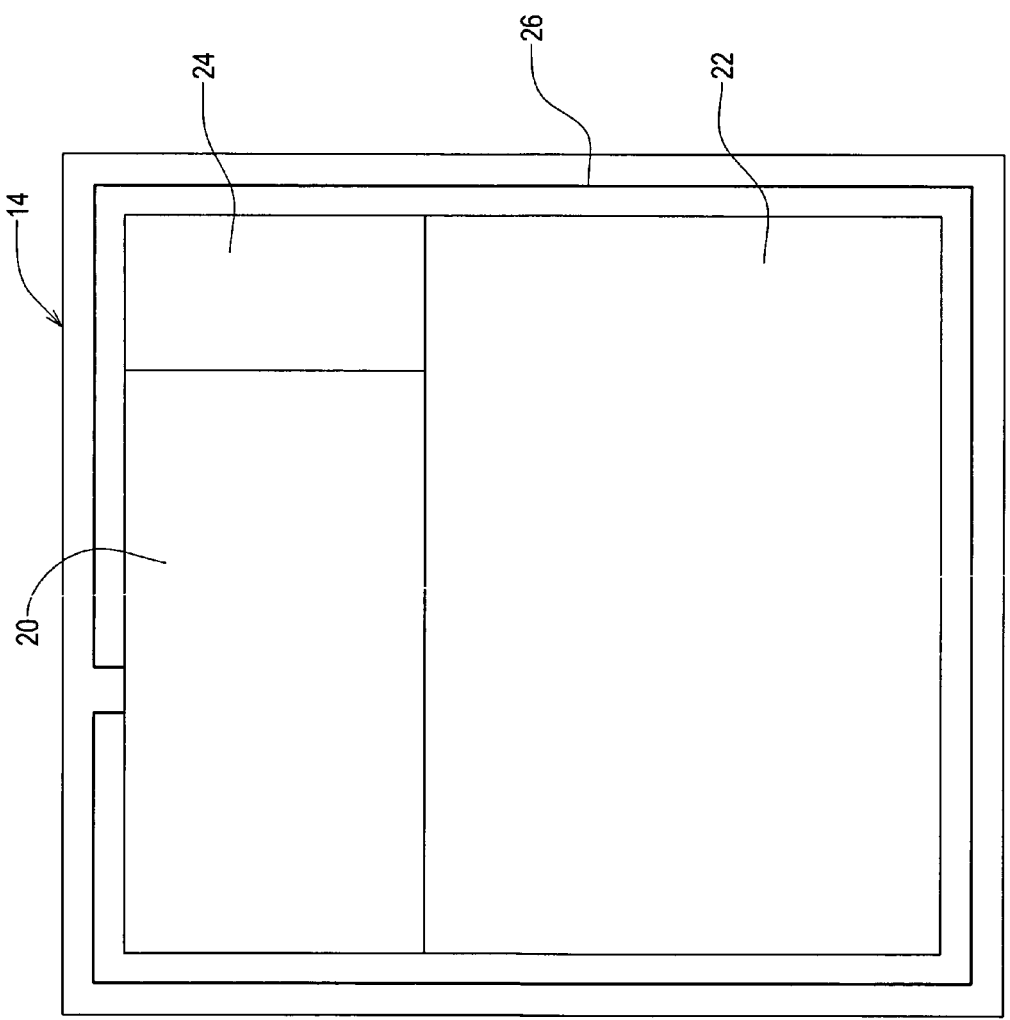
FIG. 2 illustrates a memory tag for use in the document of FIG. 1 according to an embodiment of the invention.

Referring now to FIG. 2, a schematic of a memory tag 14 is shown. The memory tag 14 is an memory tag provided on a chip, and comprises an transponder circuit 20, a memory 22, a power supply capacitor 24 and an antenna coil 26 having only a few turns e.g. five, or as in this case a single turn. The transponder circuit 20 operates at 2.45 GHz, is of an area of approximately 0.5 $mm^2$, and will be described further below. The memory 22 provides 1 Mbit of capacity of non-volatile memory and is of an area of approximately 1 $mm^2$ and uses FRAM (ferroelectric random access memory) or MRAM (magnetoresistive random access memory) or similar memory technology requiring low power. The memory tags 14 in this example are of a substantially square shape in plan view with an external dimension D for their sides of around 1 mm, although they may be of any other shape, such as oblong, as desired.

Referring now to FIG. 3, the circuitry of a memory tag 14 and circuitry 28 of the read/write device 16 are illustrated schematically, using conventional component identifications (C-capacitor, L-inductance, R-resistor, D-diode and S-switch). The transponder circuit 20 of the memory tag 14 comprises a capacitor C2 which, in combination with the antenna coil L2(26), forms a resonant circuit with component values being chosen to tune the combination to approximately 2.45 GHz for inductive coupling with the read/write device 16. The portion of transponder circuit 20 responsible for power supply is diode D1 and capacitor C4(24), with diode D1 rectifying the alternating current generated by the inductive coupling and the capacitor C4 acts as a power supply storage. The portion of the transponder circuit 20 responsible for receiving transmitted data from the read/write device 16 is diode D2, capacitor C5 and resistor R1 which form a simple envelope detector; the data thus received is stored in memory 22. The portion of the transponder circuit 20 responsible for the reading of data from the memory 22 is the tuned circuit L2/C2 in combination with S1 and C3, switching C3 in and out of the circuit using S1 changes the resonance of tuned circuit L2/C2 resulting in phase modulation of the reflected power from the memory tag 14 to the read/write device 16.

The circuit 28 of the read/write device 16 comprises a signal generator 30 which generates a signal at the chosen frequency of 2.45 GHz. This signal passes via an amplitude modulator 32, where it is amplitude modulated with data to be written to the memory tag 14, and a splitter 34, to an antenna L1 and capacitor C1 which form a tuned circuit. The component values of L1 and C1 being chosen to tune it to 2.45 GHz, as for the tuned circuit in the memory tag 14, in order to maximise inductive coupling between the two circuits, and thus transmission of power and data to the memory tag 14.

The splitter 34 takes a part (as much as 50% of the power) of the amplitude modulated signal, for use as a reference signal, and passes it to a multiplier 36. The signal received from the memory tag 14, via the tuned circuit L1/C1 and divided from the outgoing signal by a coupler 38, is also passed to the multiplier 36. Thus the transmitted amplitude modulated signal and received signal are multiplied and then pass through a low pass filter 40 to provide a signal comprising the phase modulation from the memory tag 14 and thus indicative of the data read from the memory tag 14. This signal is then passed to the host computer or other device 18 to which the read/write device 16 is connected, for subsequent data processing.

One amplitude modulation format which may be used to apply the data to be transmitted to the 2.45 GHz signal is Amplitude Shift Keying (ASK) which only requires the simple envelope detector D2/C5 described in the circuit 20. However, other amplitude modulation formats may also be employed. Further alternatives are Frequency Shift Keying (FSK) and Phase Shift Keying (PSK) that provide near constant envelope modulation, that is without any significant amplitude modulation, however these options have more complex demodulation requirements and thus demand more complex circuitry in the memory tag 14.

With the apparatus of memory tag 14 and read/write device 16 described above power transfer of around 25% can be achieved with a distance of around 1.8 mm between the antennae L1 and L2, of the read/write device 16 and memory tag 14 respectively. This is sufficient to transfer enough power to the memory tag 14 for it to operate.

The memory tags 14 have an external dimension D of around 1 mm, as described above, and therefore the read/write device 16 can communicate with them over a relatively short range, in this example of approximately 2 D, (as illustrated on FIG. 1 by broken circle 17). However, the distance over which the read/write device 16 and memory tag 14 will communicate effectively will clearly vary with the exact details of their construction, and it may therefore be up to 10 D. Use of distances greater than this would limit the ability to use a plurality of memory tags 14 on a single sheet of paper 10, or other item, due to the distances which would be necessary between the memory tags 14 to ensure that the read/write device 16 does communicate with the desired memory tag 14 out of a number present. To ensure that communication is with the correct memory tag 14 in every circumstance a communication distance of 5 D or less is preferable.

The memory tags 14 will preferably have a data rate of 10 $\text{Mbits}^{-1}$, which is two orders of magnitude faster than is typical in prior art devices. Such a data rate would enable the read/write device 16 to be held over the memory tag for a very short period of time ("brush and go") for the data to be read or written as appropriate.

To provide for unique identification of the memory tag 14 an identifier is stored in the memory tag memory 22, as illustrated at 40. This identifier 40 is generated from a readable structure associated with the memory tag 14. By "readable structure", it is intended to mean any physical structure, the components or physical arrangement of which may be in some way detected and used to generate a numerical code, and where the structure is sufficiently complex that an identifier of sufficient length can be generated.

Figure 4:
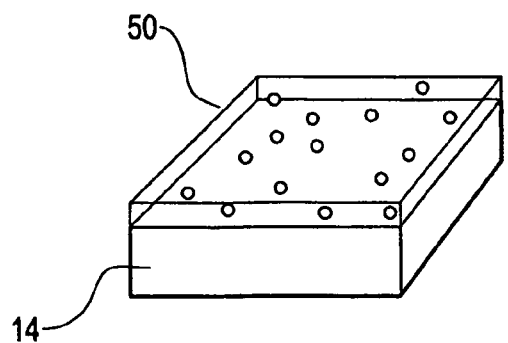
FIG. 4 shows the memory tag of FIG. 2 provided with a readable structure according to an embodiment of the invention.
Figure 5:
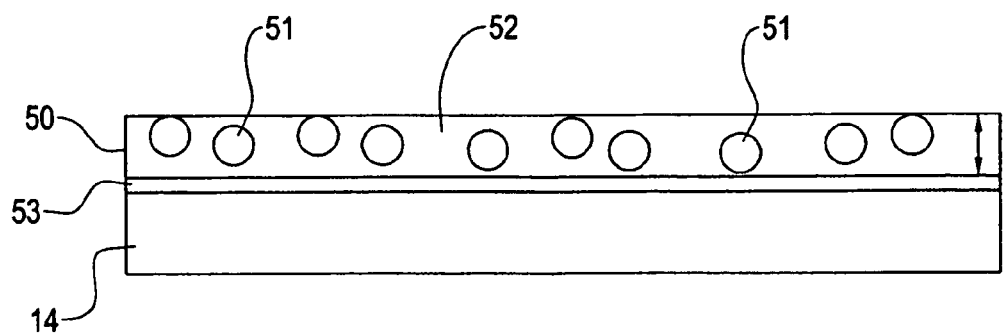
FIG. 5 shows the readable structure of FIG. 4 in more detail.
Figure 6:
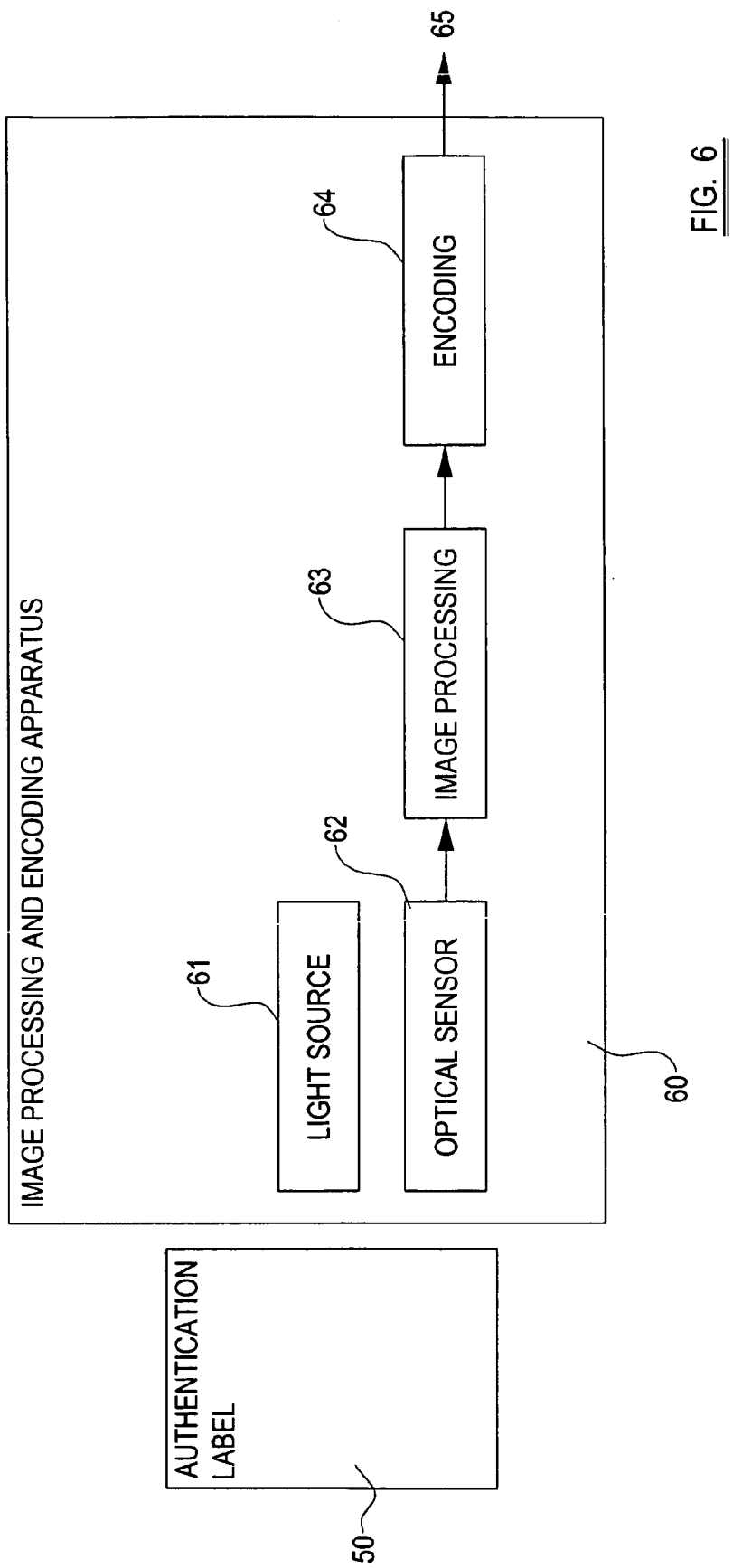
FIG. 6 is a diagrammatic illustration of an encoder for use with a memory tag embodying the present invention.

The physical structure may be provided on the memory tag 14 itself. For example, with reference to FIGS. 4 and 5, a memory tag is generally shown at 14, provided on its upper surface with a readable structure 50. The readable structure 50 comprises a plurality of particles 51, such as glass beads, embedded in a matrix 52 such as an appropriate glue or resin or any other convenient matrix. The readable structure is bonded to the upper surface of the memory tag 14 by a glue layer 53. In this example, to permit the readable structure 50 to be optically readable, the matrix 52 is a translucent or transparent material and the particles may be appropriate optically detectable particles such as beads, with or without an appropriate coating. The depth of the readable structure 50 is such that it is deeper than the size of the particles 51, such that the particles 51 are distributed in a random 3-dimensional arrangement within the matrix 52.

To read the readable structure 50, a reading and encoding apparatus is generally shown at 60. The reading and encoding apparatus has at least one light source 61 to illuminate the readable structure 50. Reflected light is detected by an optical sensor 62 which is passed to an image processing unit 63 which, in this example, is operable to identify the positions of the particles 51. The position information is passed to an encoding module 64, which generates an output 65 which may be passed to, for example, the host device 18.

Figure 7:
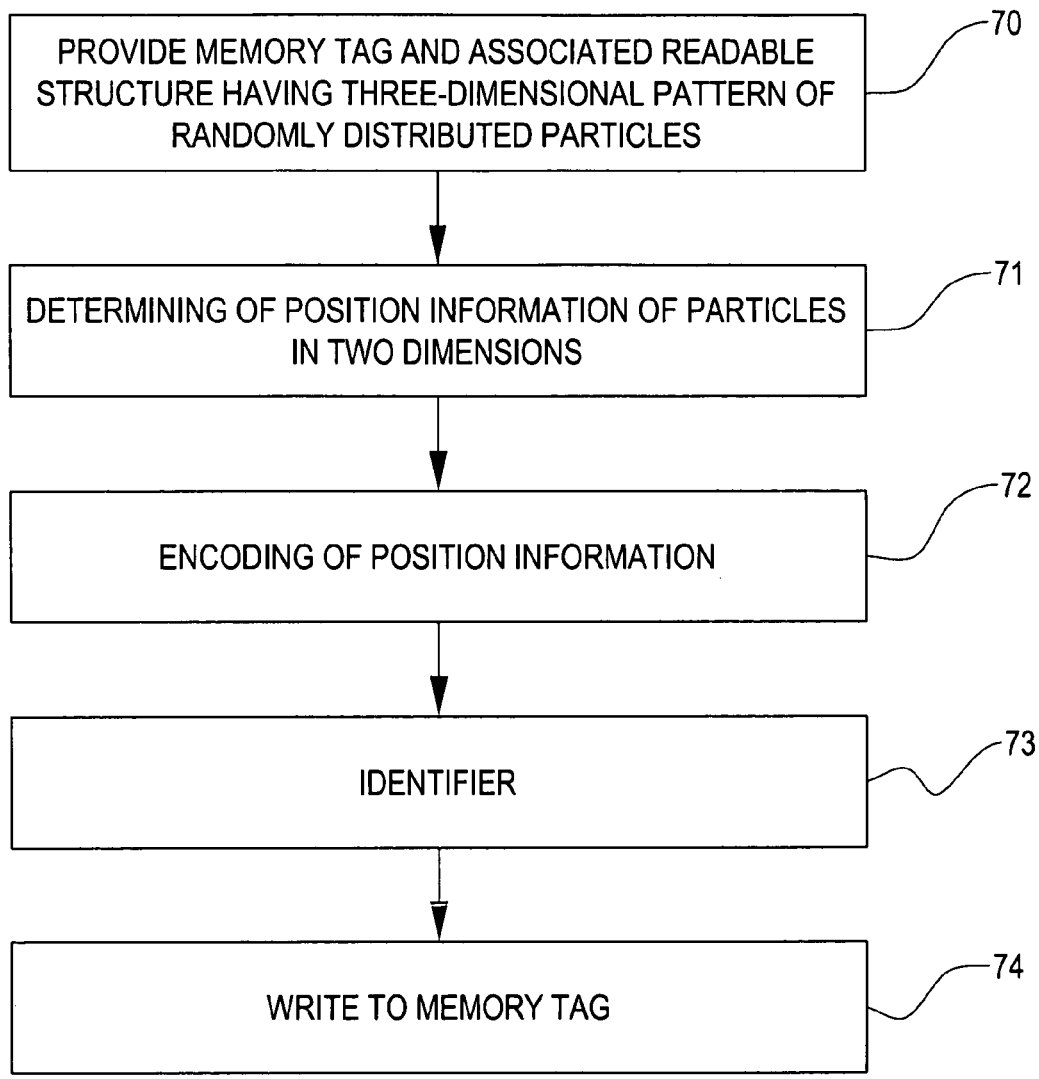
FIG. 7 is a flow diagram illustrating a method of providing a memory tag in accordance with an embodiment of the invention.

A method of providing a memory tag 14 with an identifier using the readable structure so is illustrated with reference to FIG. 7. At step 70, the memory tag 14 is provided with the associated readable structure 50, this particular example having a 3-dimensional pattern of randomly distributed particles 51. Using the image processing and coding apparatus 60, the readable structure 50 is illuminated with the light source 61 and the optical sensor 62, for example, a charge-coupled device, passes an image of the readable structure 50 to the image processing module 63. At step 71 the position information of the particles is determined from the image by the image processing module 63 and in step 72 the position information acquired in step 71 is encoded.

This can be done by generating a check-sum or a hash-key on the basis of the position information. For example, a cyclic redundancy check (CRC) check-sum is calculated to provide the authentication code. This can be done by sorting the measured x,y co-ordinates of the positions of the particles by the x-co-ordinate. The y-co-ordinate values are concatenated in the order as determined by the sorting to provide a polynomial, which is divided by the generator polynomial of the CRC encoding.

For example, a standard CRC-32 Polynom can be used as a generator polynomial as it is as such known for Ethernet, Infiniband, FibreChannel, and ATM transmissions ($x^{32}+x^{26}+$ $x^{23}+x^{22}+x^{16}+x^{12}+x^{11}+x^{10}+x^8+x^7+x^5+x^4+x^2+x^1+1$). The result of this polynomial division is the authentication code for the authentication object, which is output in step 306. Such a method and readable structure are known from our co-pending application no. PCT/EP 2004/004538.

Alternatively, any hashing process such as SHA-1 could be used.

In order to increase to stability of the encoding, the y-co-ordinate values are shifted by a number of bit positions, such as four bits, to the left before the concatenation. For example, only the four most significant bits of each y-co-ordinate value are used for the concatenation.

At step 73, the identifier is output based on the encoded position information. The identifier may simply be the encoded position information, or more preferably the encoded position information is provided to a function, such as a hash function, which will generate an output from the encoded positioned information in a one-way manner, or by using some other one-way function. At step 74, in this example, this identifier is written to the memory 22 of the memory tag 14 as illustrated at 40.

Figure 8:
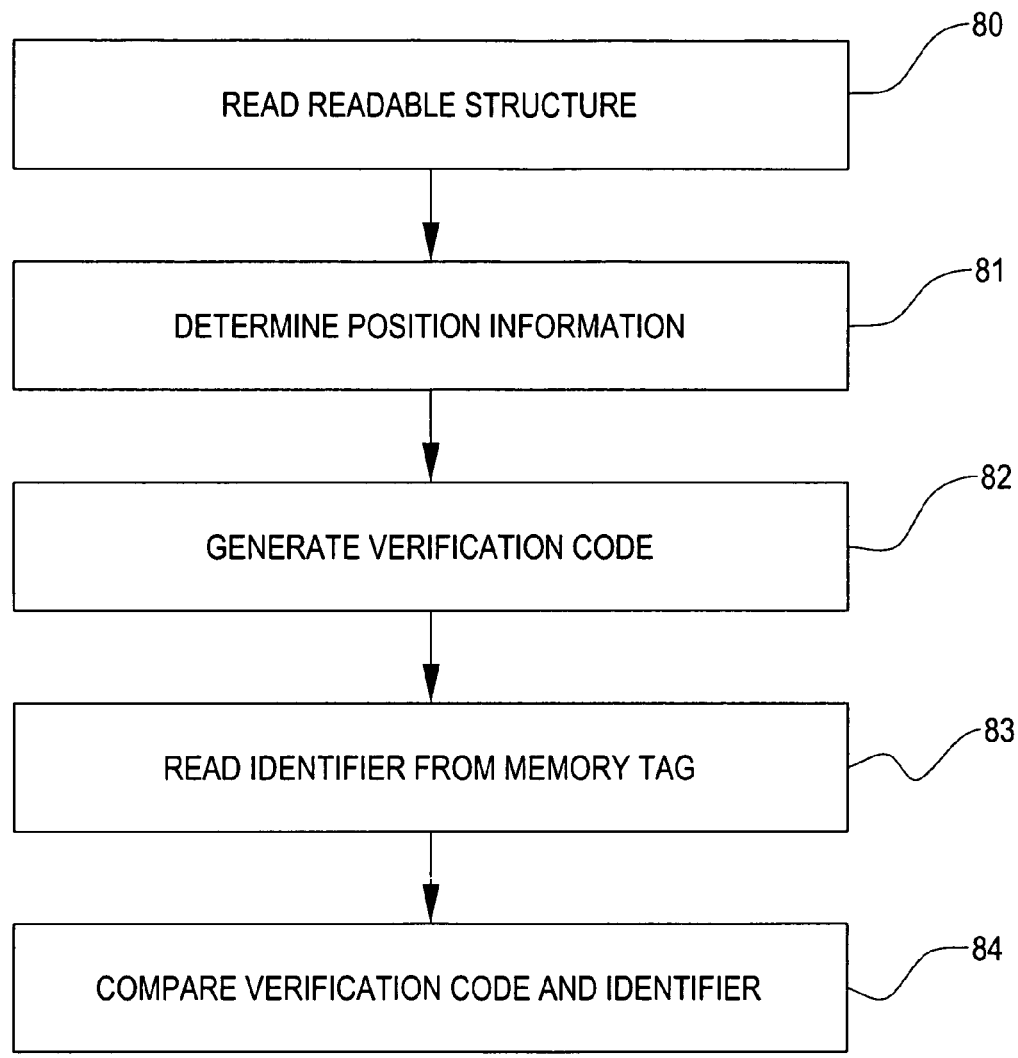
FIG. 8 is a flow diagram showing a method of reading a memory tag in accordance with an embodiment of the invention.

When it is desired to check the identity of the memory tag 14, for example, to verify the information stored in the memory tag 14 and/or on the document 10, the method of FIG. 8 is performed. At step 80, the readable structure is read by an imaging processing and encoding apparatus 60 in like manner to step 70 of the method of FIG. 7. The position information is determined at step 81 in like manner to step 71, and at step 82 a verification code is generated by performing the encoding and identifier generation steps 72 and 73 as shown in the method of FIG. 7. Where the steps 80, 81, 82 are performed by an image processing encoding apparatus 60, and after the verification code is generated at step 82, an output 65 may be generated which is passed to, for example, the host apparatus 18. At step 83, the stored identifier 40 is read from the memory tag 14 using the read/write device 16, and at step 84, the host apparatus 18 compares the verification code and identifier. If the verification code and identifier correspond or match, the memory tag 14 may be accepted as valid and as not having been tampered with.

The stored identifier may be locked to prevent subsequent alteration or tampering. It is known to prevent changes to information stored in a memory in a number of ways, for example by including a fusible link in the memory which may be broken to prevent further data being written to the memory. It is also known to provide a memory where each block of the memory has a write protection bit associated with it. When the write protection bit is set, the associated memory block cannot be written to and the security bit itself cannot be changed, thus preventing subsequent changes to the memory block. Such an arrangement would be suitable for use in this application, where the identifier can be written to a block of memory, and the security bit for that block of memory subsequently set to prevent the stored identifier being changed.

The readable structure may be provided otherwise as desired. For example, the readable structure may not be physically attached directly to the memory tag 14. In an alternative embodiment, where the memory tag 14 is provided as part of the document 10, the readable structure may comprise an appropriate part of the substrate 12 of the document 10. In the particular example, the surface structure of the paper substrate 10—that is, the "weave" of the paper—may provide an appropriately detectable readable structure which may be read and the characteristics used to generate an identifier using the method described above. This may be achieved using optical mouse navigation technology (as described in, for example, U.S. Pat. No. 5,578,813, the content of which is incorporated by reference herein) using conventional sensors for an appropriately delimited region of the substrate.

It will be apparent that the readable structure selected and whether or not the identifier is encoded in the memory tag may be chosen depending on the level of security required. Thus, to ensure that the readable structure cannot be provided or replicated even when the identifier is known, then it is desirable to use a readable structure having an essentially random structure, that is such that detectable elements of the structure cannot easily be arranged in a predetermined configuration, such as a random dispersal of detectable particles in a matrix or in the weave of a paper document as described herein. Such random structures may have the advantage of being tamper evident, such that it will be apparent if an attempt has been made to change or otherwise damage the matrix in which the detectable particles are buried or otherwise damage a random structure. In the particular example of providing detectable particles in a matrix which can be detected using coherent radiation and measuring the results using a speckle pattern, damaging the matrix will result in a different speckle pattern. Equally, where a two dimensional image is used, changes to the readable structure will appear as changes in the image and hence produce a different value.

Similarly, the question of how the identifier is held in the memory of the memory tag, if at all, again depending on the level of security required for the particular application. In the example described herein, the memory tag identifier is held in the memory tag memory, and may be protected against re-writing, and so any mismatch between the identifier encoded in the readable structure and the identifier stored in the memory may be regarded as evidence of tampering and thus cast out on validity of the memory tag. In this way, damage to the readable structure and/or attempts to re-write the stored identifier in the memory will lead to a mismatch between the stored and generated identifier. In applications such as this, storing the identifier in the memory would be unnecessary.

It is envisaged that other uses may be made of providing the readable structure on the memory of the memory tag, such as enabling a reader to pick out one memory tag from a number of memory tags by for example optically scanning the surface of a document to locate the relevant memory tag, and then interrogating the memory tag via the inductive coupling connection as described herein. As described herein, the memory tag 14 is detectable through inductive coupling with the read/write device over a range of only potentially a few millimetres. By providing, for example, an optically detectable readable structure 50, the appropriate tag may be identified using the optically readable structure at a longer range and the memory 22 may be subsequently read to retrieve the stored identifier 40 when the read/write device 60 is then brought sufficiently close to the memory tag 14 for sufficiently efficient inductive coupling to occur. In applications such as this, storing the identifier in the memory would be unnecessary.

As indicated above, the image processing and encoding apparatus 60 may use other techniques such as those known from, for example, optical mice or handheld scanners. In such application it is know to provide a simple sensor which acquire images of the surface over which the mouse is moving and automatically compares subsequent consecutive images For example, in U.S. Pat. No. 5,578,813 it is know to detect movement of a scanner by illuminating the surface of a document and comprising high contrast images of the surface. Sensors are available off the shelf that implement this and comparable technology. On printed media, the variations in height are usually about 10 nm to 40 nm due to the weave and suitable illumination of a part of the surface will generate a unique, non-replicable image which can be used to generate an identifier. As an alternative, coherent light may be used to generate a high-contrast speckle pattern. Such an image detection technology may be advantageously used in the image processing and encoding apparatus 60.

Although the memory tags 14 described above operate at 2.45 GHz it should be understood that memory tags operating at other frequencies may be used to implement the invention. Factors affecting the choice of operating frequency for the memory tags are: a) government regulations concerning radio frequency transmissions; b) adequate bandwidth (consistent with government regulations); c) frequency high enough to render the physical size of components in the memory tag small enough to keep the area of silicon required low (and hence the cost to manufacture low); d) frequency low enough to provide adequate performance when using low-cost high-volume CMOS technology to manufacture the memory tag.

The invention claimed is:

1. A memory tag comprising a memory, there being a readable structure associated with the memory tag,
the readable structure being readable to generate an identifier, wherein the identifier is generated based on detectable elements of the readable structure, the detectable elements being arranged in the readable structure in a configuration that is not based on a predetermined value for the identifier.

2. A memory tag according to claim 1 wherein the identifier is stored in the memory of the memory tag.

3. A memory tag according to claim 1 wherein the readable structure is provided on the memory tag.

4. A memory tag according to claim 3 wherein the readable structure is optically readable.

5. A memory tag according to claim 4 wherein the readable structure comprises a plurality of detectable elements held in a matrix.

6. A memory tag according to claim 1 wherein the readable structure comprises a random structure.

7. A document comprising a substrate and a memory tag having a memory attached to the substrate, the document further comprising a readable structure associated with the memory tag, the readable structure being readable to generate an identifier, wherein the identifier is generated based on detectable elements of the readable structure, the detectable elements being arranged in the readable structure in a configuration that is not based on a predetermined value for the identifier.

8. A memory tag according to claim 7 wherein the identifier is stored in a memory of the memory tag.

9. A document according to claim 7 wherein the readable structure comprises a part of the substrate.

10. A document according to claim 9 wherein the substrate comprises paper and the readable structure comprises part of the surface of the paper.

11. A document according to claim 7 wherein the readable structure is provided on the memory tag.

12. A document according to claim 11 wherein the readable structure is optically readable.

13. A document according to claim 12 wherein the readable structure comprises a plurality of detectable elements held in a matrix.

14. A document according to claim 7 wherein the readable structure comprises a random structure.

15. A method of providing a memory tag having a memory, the method comprising:
providing a readable structure associated with the memory tag; and
reading the readable structure and generating an identifier, wherein the identifier is generated based on detectable elements of the readable structure, the detectable elements being arranged in the readable structure in a configuration that is not based on a predetermined value for the identifier.

16. A method of claim 15, further comprising storing the identifier in the memory of the memory tag.

17. A method of claim 15, further comprising providing the readable structure on a surface of the memory tag.

18. A method of providing a memory tag having a memory, the method comprising:
providing a readable structure associated with the memory tag;
providing the readable structure on a surface of the memory tag;
disposing detectable particles within a matrix on the memory tag to form the readable structure; and
reading the readable structure and generating an identifier.

19. A method according to claim 17 comprising associating the memory tag with a substrate wherein a surface part of the substrate provides the readable structure.

20. A method of providing a memory tag having a memory, the method comprising;
providing a readable structure associated with the memory tag;
providing the readable structure on a surface of the memory tag;
associating the memory tag with a substrate wherein a surface part of the substrate
provides the readable structure, wherein the substrate comprises paper and wherein the readable structure comprises a weave of the paper; and
reading the readable structure and generating an identifier.

* * * * *